UNITED STATES PATENT OFFICE.

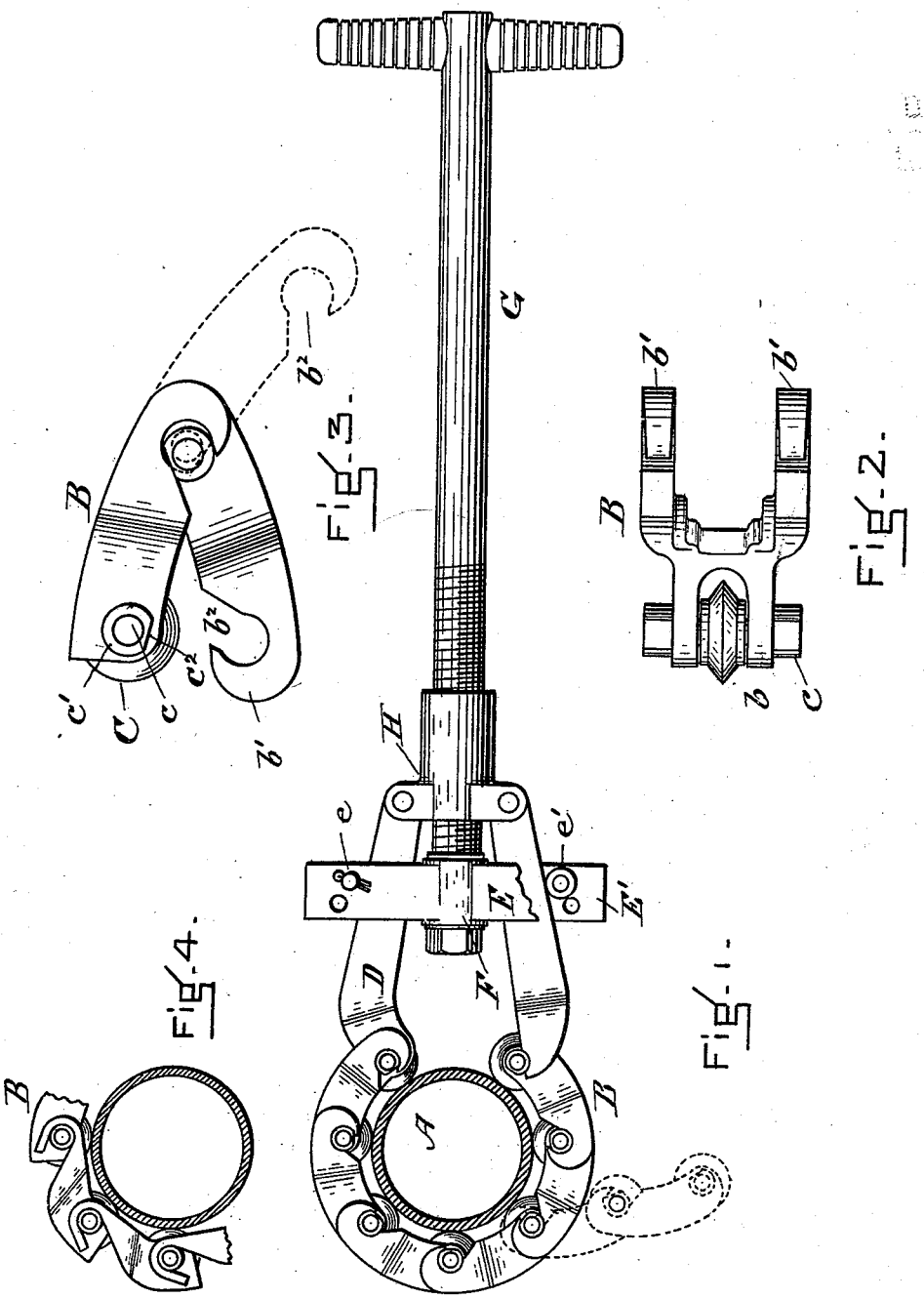

WILLIAM ANDERSON, OF BOSTON, MASSACHUSETTS.

PIPE-CUTTER.

SPECIFICATION forming part of Letters Patent No. 553,663, dated January 28, 1896.

Application filed December 28, 1894. Serial No. 533,152. (No model.)

*To all whom it may concern:*

Be it known that I, WILLIAM ANDERSON, of Boston, in the county of Suffolk and State of Massachusetts, have invented a new and useful Improvement in Pipe-Cutters, of which the following is a specification.

My invention relates to that class of cutters in which cutting-tools are mounted in links which are connected to form a chain, the ends of which are drawn together by some suitable means, so that the cutting-tools lie about the pipe and may be oscillated about it by means of a suitable handle. The links in such cutters, however, have, so far as I know, always been fastened together by pins which had to be removed before the links could be separated.

My invention consists of a cutter composed of a series of tool-carrying links each so shaped that it will hook onto or interlock with a suitable portion of the link next to it. Thus the cutter can be made longer or shorter at will simply by the engaging or disengaging of the links and without the removal of any other part—such, for example, as a coupling-pin.

My invention will be understood by reference to the drawings.

Figure 1 shows my cutter complete and in operation with links of the preferred form. Fig. 2 is a plan of one of the links. Fig. 3 is a side view showing the mode of disengagement of the links, and Fig. 4 is a modification.

A is the pipe which is to be cut. The links are indicated at B, and each of those shown in Figs. 1, 2, and 3 has a pair of ears $b$ which hold a stud $c$, upon which the cutter C is free to turn. The ends of this stud $c$ project on each side, and, as shown, each end is enlarged, for example, by means of a collar $c'$ which is preferably flattened on one side $c^2$, (see especially Fig. 3,) for the purpose stated below. The other end of the link is provided with two hooks $b'$ which are adapted to hook over the collars $c'$ of the next link in series.

I prefer to shape the opening to each hook as shown at $b^2$. By this means the hooks of any one link will easily slip onto the ends of the stud of the next succeding link, (see Fig. 3, where the operation of putting two links together is shown,) and yet when the links are turned into operating position they will be so interlocked that they cannot be disengaged during any ordinary use of the cutter. The flat portion of the collar makes the end of the stud so narrow that it can enter the narrow mouth of the hook, and yet it is so placed that when the link is in operative position the larger diameter of the collar is always presented to the mouth of the hook.

It will be seen that the links can never fall apart while the device is in operation, or is being put into operation, for the reason that under such conditions the parts can never assume the position shown in Fig. 3, which is the only position in which the links can be separated. This is the simplest and best means of interlocking the links of which I am now aware.

I prefer to join the ends of these links by a clamp consisting of a pair of tongs D, mounted on a handle in a manner to be described, the tongs being adjusted to draw the ends of the cutter-chain together, so as to cause the cutter to bear upon the pipe in the following manner: One portion of these tongs has a stud and collars $c'$ $c'$ and carries a cutter C. The other portion is grooved to bear on the collar $c'$ of the end link. (See Fig. 1.) There is a slide composed of two bars E E' connected together by means of pins $e$. These bars are each attached to a sleeve F free to turn upon the end of the handle G. Between these bars lie the tongs D, which are also pivotally connected to a sleeve H threaded on its interior and adapted to turn on threads $g$ on the handle G. $e'$ are rollers, which bear upon the outside surfaces of the tongs, so that as the slide is pushed toward the pipe the rollers $e'$ bear upon the outside of the tongs, and consequently cause them to pull the ends of the cutter together.

It will be seen that by turning the handle G one way or the other the bars E E' are either pushed toward the pipe or away therefrom. By this means the ends of the tongs can be easily drawn together, this being a very simple means for the purpose, the handle serving both to operate the cutter and also to change the adjustment of the cutter as the cut is made deeper.

In Fig. 4 there is shown a modification in which the mouth of the hook is as large as the diameter of the collar or stud over which it is to hook; but the links in this case are adapted to lie with their backs, so to speak, against the pipe instead of their faces, being curved slightly backward, as will be understood from the drawings. This form of my invention is not as good as the form shown in Figs. 1, 2 and 3, for the reason that when the cutter is not in use the links will fall apart; but it will serve as an illustration of one form of cutter which embodies my invention.

I prefer to use the ends of the stud upon which the cutter rotates to engage with the hooks on the next link; but it is evident that other studs may be furnished for the purpose, if thought best, the main feature of my invention consisting in the interlocking of the adjacent cutter-carrying links without the addition of a pin or other part separate from the link itself and in such a manner that the parts will not separate during the cutting operation.

What I claim as my invention is—

1. The pipe cutter above described consisting of a series of cutter carrying links, each adapted to interlock with the next link in series, in combination with means whereby the ends of said series of links are bound to the pipe and may be oscillated, all as set forth.

2. In a link pipe cutter, a series of cutter carrying links each having at one end one or more hooks, the mouths of which are narrower than their interior or bearing surfaces, and at the other end corresponding studs shaped substantially as described, the smaller diameter of each stud corresponding in length with the width of the mouths of said hooks, and its largest diameter corresponding in length to the interior diameter of said hooks, all as set forth.

3. In combination with a link pipe cutter, the clamp above described consisting of a pair of tongs, the outer ends of which are adapted to engage with the ends of a series of links, and the inner ends of which are pivotally connected to a threaded sleeve mounted on a threaded handle, in combination with the clamping bars E, E' mounted upon a sleeve free to turn upon the end of said handle, all as and for the purposes set forth.

4. In combination with a series of cutter carrying links, the clamp above described consisting of a handle carrying a pair of tongs mounted upon a sleeve free to turn upon the end of said handle, the free ends of said tongs being adapted to engage with and draw together the ends of said links, and means substantially as described whereby the free ends of said tongs are clamped, as and for the purposes set forth.

In testimony whereof I have hereunto set my hand this 22d day of December, 1894.

WM. ANDERSON.

Witnesses:
HENRY F. COGGSHALL,
G. F. MACMUN.